United States Patent
Morley (10) Patent No.: US 9,568,591 B2
(45) Date of Patent: Feb. 14, 2017

(54) METHOD FOR SEARCH RADAR PROCESSING USING RANDOM MATRIX THEORY

(71) Applicant: Peter Dan Morley, Front Royal, VA (US)

(72) Inventor: Peter Dan Morley, Front Royal, VA (US)

( * ) Notice: Subject to any disclaimer, the term of this patent is extended or adjusted under 35 U.S.C. 154(b) by 157 days.

(21) Appl. No.: 14/121,980

(22) Filed: Nov. 10, 2014

(65) Prior Publication Data

US 2015/0123841 A1    May 7, 2015

(51) Int. Cl.
| | |
|---|---|
| *G01S 7/292* | (2006.01) |
| *G01S 13/08* | (2006.01) |
| *G01S 7/41* | (2006.01) |
| *G01S 7/00* | (2006.01) |
| *G01S 13/00* | (2006.01) |

(52) U.S. Cl.
CPC .............. *G01S 7/2927* (2013.01); *G01S 7/414* (2013.01); *G01S 13/08* (2013.01)

(58) Field of Classification Search
CPC .............. G01S 7/02; G01S 7/28; G01S 7/285; G01S 7/292; G01S 7/2923; G01S 7/2927; G01S 7/41; G01S 7/414; G01S 13/02;G01S 13/06; G01S 13/08; G01S 7/415; H04L 27/26; H04L 27/30
See application file for complete search history.

(56) References Cited

U.S. PATENT DOCUMENTS

| | | | | |
|---|---|---|---|---|
| 5,333,191 A | * | 7/1994 | McCarthy | H04L 27/30 379/282 |
| 5,376,940 A | * | 12/1994 | Abatzoglou | G01S 7/415 342/101 |
| 7,079,072 B1 | * | 7/2006 | Abatzoglou | G01S 7/414 342/192 |

* cited by examiner

*Primary Examiner* — Bernarr Gregory
(74) *Attorney, Agent, or Firm* — Maier & Maier, PLLC

(57) ABSTRACT

A new method for processing search radar data is revealed using the mathematics of random matrix theory. During the time that the radar receiver is listening for return target echoes, the raw data stream is fed to an analog to digital converter to create a sample voltage file. This sample voltage file is processed by a digital signal processor that computes the eigenvalues of a sample covariance matrix generated for each pulse duration interval. The ratio of the largest to smallest eigenvalue is determined and compared to the system noise eigenvalue ratio. The sensitivity for detecting targets over the present state of the art is expected to be an approximate enhancement factor of one thousand, due to the detection of coherent energy instead of a transmitted waveform. The increase of detection distance for same radar cross section is expected to be an approximate 5.6 enhancement factor.

1 Claim, 8 Drawing Sheets

Method for Search Radar Processing Using Random Matrix Theory
Peter D. Morley

Method for Search Radar Processing Using Random Matrix Theory
Peter D. Morley

FIG.1

Method for Search Radar Processing Using Random Matrix Theory
Peter D. Morley

Method for Search Radar Processing Using Random Matrix Theory
Peter D. Morley $$V = \begin{bmatrix} \vec{V_1} \\ \vec{V_2} \\ \vec{V_3} \\ ******** \end{bmatrix}$$

Method for Search Radar Processing Using Random Matrix Theory
Peter D. Morley

Method for Search Radar Processing Using Random Matrix Theory Peter D. Morley

METHOD FOR SEARCH RADAR PROCESSING USING RANDOM MATRIX THEORY

REFERENCES CITED

| U.S. Patent Documents | | |
|---|---|---|
| 4,005,415 A | March 1975 | Kossiakoff |

Other Publications: P. D. Morley and Jerry W. Brown; 'Detecting Coherent Energy'; January 2012; International Journal of Modern Physics C; vol. 23, No. 1; 1250006. Radartutorial.eu.

FIELD OF THE INVENTION

This invention relates to a new processing method for determining the detection and distance of a target from receipt of reflected energy.

BACKGROUND

Figure 1:
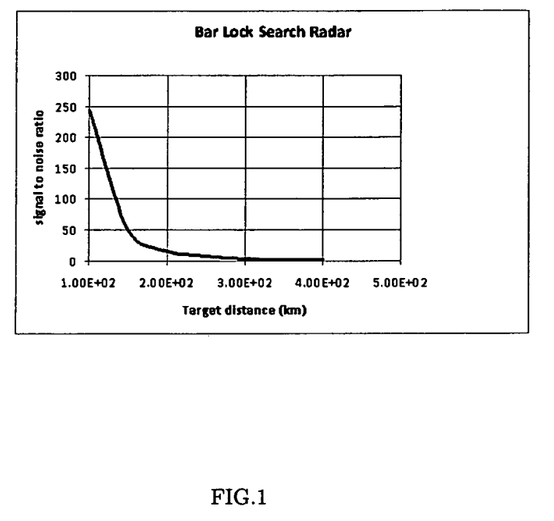
FIG. 1 gives a signal-to-noise power ratio for a search radar using the Russian P37 radar with a 10 m² target as the example.

Search radars transmit energy packets and receive energy echoes from targets. In order to discover a target, the signal to noise power ratio (SNR), where signal power here is the returned radar echo power, and noise power is the system power for no target, must be equal to or greater than a threshold (Kossiakoff U.S. Pat. No. 4,005,415). In operational uses, this threshold is 10. As an example of search radars, in FIG. 1, a nominal SNR curve as a function of target distance is given for the Russian P37 'Bar Lock' search radar (www.radartutorial.eu), for a 10 m² target. Such a target is a typical third generation fighter radar cross section for centimetric radiation. From FIG. 1, the 'Bar Lock' has a nominal detection range of approximately 220 km (SNR≅10) for this particular target. We wish to increase the detection range to approximately 1200 km for this same target radar cross section, by doing a new method of radar processing. The reader should appreciate that a detection of any target at 1200 km, yet alone a target of 10 m² cross section, is so far outside our example of a conventional P37 search radar envelope that the original Russian radar design engineers would consider it fantasyland.

SUMMARY OF THE INVENTION

The invention relies on the modern physics concept of coherent energy (P. D. Morley and Jerry W. Brown). While the words coherent energy to an engineer would mean phase array antenna or laser light (i.e. correlated light waves having nearly the same frequency and phase), the physics meaning is much deeper. Coherent energy means that when energy is converted into voltages by means of a transducer, and then digitally sampled, the voltage measured at time=now is causally related to all past voltage measurements; we say coherent energy has an infinite time correlation. The radar pulse from an antenna is coherent energy in this physical sense. This invention detects the reflected coherent energy transmitted by a radar antenna, and not the identified reflected waveform itself.

Figure 2:
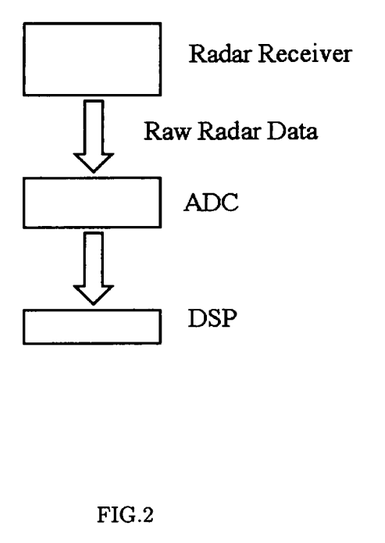
FIG. 2 gives the components used to extract raw voltage data samples during the listening phase of the radar.
Figure 3:
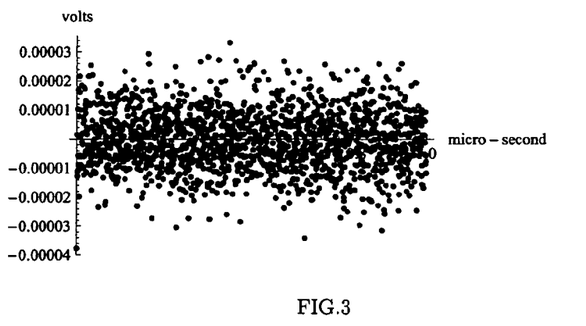
FIG. 3 gives an example of the digitized raw data for one micro-second time-slice having only noise in it, for the P37 radar example.

During the time that a receiving antenna is listening for the return radar echoes, the raw radar data is fed into an analogue-to-digital converter (ADC), FIG. 2, to obtain a stream of voltage samples. If the ADC sample rate is S samples per second, the voltage stream has samples every 1/S units of time. In FIG. 3, we show a representative example. This sample data stream in the listening phase is then divided into time-slices, each equal to the pulse duration of the transmitted pulse. Using our example of the Russian P37 search radar, its transmitted pulse duration may be one micro-second. Since we are interested in this example of detecting a target 1200 km away, the total listening time is 8 milli-seconds, so there are 8000 one micro-second time-slices. Each of these time-slices are processed by the digital signal processor (DSP), FIG. 2, in a very specific manner.

Figure 4:
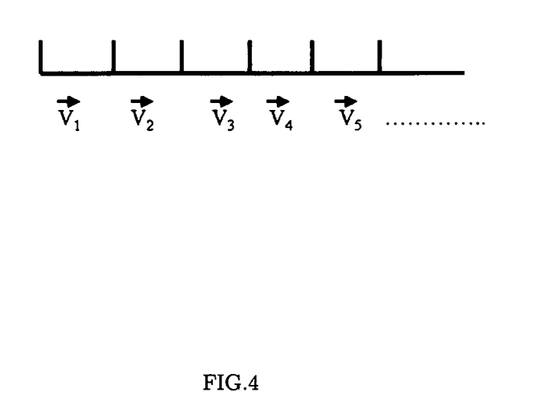
FIG. 4 shows how the digital signal processor (DSP) divides each time-slice into $N_D$ number of pieces.
Figure 5:
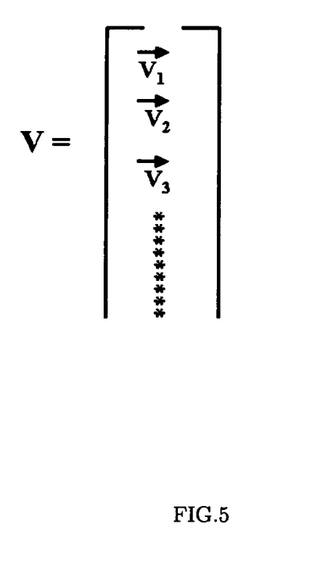
FIG. 5 shows how the column matrix is formed.

The number of voltage samples in each time-slice is Ns. The DSP sub-divides the Ns data into a number of data-segments, FIG. 4, $\vec{V}_1, \vec{V}_2, \ldots$, each having the same number of sample points. If there are $N_D$ data-segments, each has $N_S/N_D = N$ number of sample data points. We form a column matrix $\vec{V}$ of these $N_D$ data-segments as illustrated in FIG. 5. We then construct the sample covariance matrix R as $$R = \frac{1}{N} \vec{V} \times \vec{V}' \quad (1)$$

where $\vec{V}'$ is the transpose matrix. This is done for every time-slice. R is a $N_D \times N_D$ symmetric matrix and its eigenvalue ratios are determined by random matrix theory (P. D. Morley and Jerry W. Brown). If the time-slice has just noise, the ratio of the largest eigenvalue to smallest eigenvalue (call the ratio $\zeta_R$) is $$\zeta_R = \frac{(1+\sqrt{\alpha})^2}{(1-\sqrt{\alpha})^2} \quad (2)$$

If the time-slice has coherent energy within it, the formula becomes $$\zeta_R = \frac{(1+\rho)\left(1+\frac{\alpha}{\rho}\right)}{(1-\sqrt{\alpha})^2} \quad (3)$$

In both formulae, the quantity α is $$\alpha = N_D/N \quad (4)$$

Figure 6:
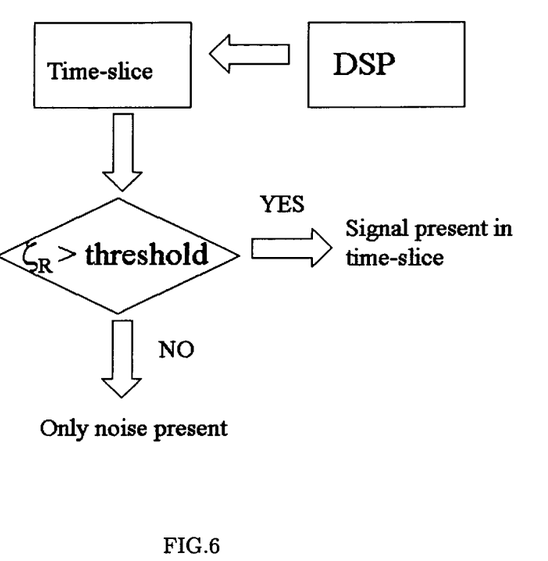
FIG. 6 shows how the time-slice having coherent energy within it is identified.

For the case of coherent energy present, the quantity ρ is $$\rho = N_D \times SNR \quad (5)$$

where SNR is the signal-to-noise ratio discussed earlier. The DSP determines $\zeta_R$ for each time-slice and compares it to a threshold, FIG. 6. If the max-to-min eigenvalue ratio $\zeta_R$ is greater than the threshold, the time-slice has the reflected target energy in it and the range is determined by the positional value (time-stamp) of the time-slice in the listening data stream. If the transmitter and receiver were the same antenna, the distance is just $(T_{received} - T_{emitted}) \times c/2$ where c is the speed of light, $T_{received}$ is the receive time of the time-slice having coherent energy, and $T_{emitted}$ is the original time of the emitted pulse.

In order to address the possibility that a reflected echo falls between two time-slices, the total eigenvalue pass by a DSP is done twice where the time-slices differ by half the time of the pulse duration. If the pulse duration were one micro-second, for example, the time-slices of the two passes differ in their start times by one-half micro-second. One pass or both passes may find coherent energy in neighboring time-slices.

DESCRIPTION OF THE PREFERRED EMBODIMENTS

In order for the asymptotic random matrix theory formulae be accurate, each time slice must have a large number of voltage samples. Operationally, each micro-second time-slice should have at least 160000 samples in it. That means the ADC sample rate should be at least 160×10⁹ samples per second. The threshold value for the decision tree is set by the noise max-to-min eigenvalue ratio, and its standard deviation. By taking many time-slices of noise, the noise-mean ($\mu_{noise}$) and noise-standard-deviation ($\sigma_{noise}$) of the noise eigenvalues are determined so the threshold should be $$\zeta_R > \mu_{noise} + \sigma_{noise} \quad (6)$$

There is a small sensitivity on the choice of the number $N_D$ of data segments each time-slice is divided into, from the corrections to the asymptotic random matrix theory. In general, the number $N_D$ of data segments should have about 10000 samples in them (or higher).

Figure 7:
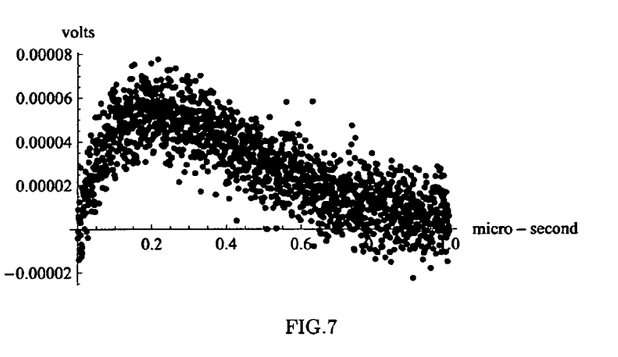
FIG. 7 shows the one micro-second time-slice of digitized raw data associated with the distance of 220 km with coherent energy residing in it, for the P37 radar example.
Figure 8:
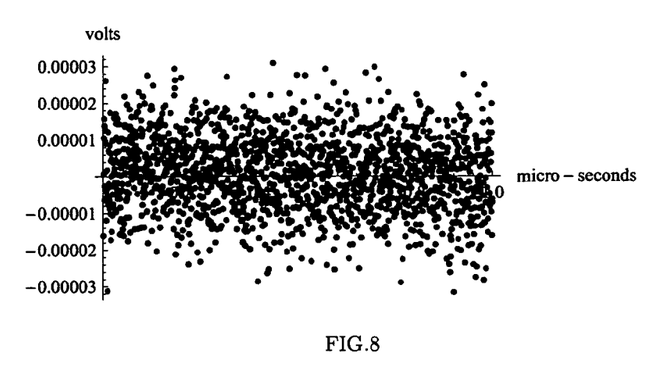
FIG. 8 shows the one micro-second time-slice of digitized raw data associated with the distance of 1200 km with coherent energy residing in it, for the P37 radar example. Compare to noise only in FIG. 3.

We finish the P37 Russian search radar example. The ADC rate is chosen to be 160×10⁹ samples per second. In FIG. 7 we present the raw data voltage samples associated with the time-slice with target located 220 km away, while in FIG. 8, we present the raw data voltage samples associated with the time-slice with target located 1200 km away, both 10 m² radar cross sections. For the simulation, we chose $N_D$=16 giving us a 16×16 sample covariance matrix, with each of the 16 $\vec{V}$ having 10000 samples in them. In the first two Tables, we see that this low radar cross section target is discernable out to 1200 km, because the measured $\zeta_R$ is significantly larger than the mean-noise+noise-standard-deviation. Again, the practical implementation requires two passes, separated by start times one-half×pulse duration. In the tables below, we give the SNR ground truth and the predicted SNR using Eq (5) in Eq (3) with the measured value of $\zeta_R$ on the left-hand-side. The mean noise plus its standard deviation for this example is 1.165, which means the measured $\zeta_R$ at 1200 km is about 12% larger and discernable. Thus the statement in the abstract that the expected enhancement is around a factor of 1000 is due to the comparison of SNR=10 to SNR=0.01. Since the SNR decreases as $$\frac{1}{R^4},$$

the stand-off distance enhancement for same radar cross section is around $$\sqrt[4]{1000} \simeq 5.6.$$

TABLE 1

P37 Russian search radar example
10 m² radar cross section

| distance (km) | noise power (W) | signal power (W) | SNR ground truth |
|---|---|---|---|
| 220 | 0.205124e−11 | 0.214881e−10 | 0.104757e+02 |
| 1200 | 0.205124e−11 | 0.242745e−13 | 0.118158e−01 |

TABLE 2

P37 Russian search radar example
10 m² radar cross section

| $\zeta_R$ | Predicted SNR | $\mu_{noise}$ | $\sigma_{noise}$ |
|---|---|---|---|
| 0.179560e+03 | 0.102801e+02 | .1152369e+01 | .1273190e−01 |
| 0.130375e+01 | 0.119743e−01 | .1152369e+01 | .1273190e−01 |

While the use of a constant threshold depending on the mean noise value of $\zeta_R$, $\mu$, and its standard deviation $\sigma$ is robust, because each is computed over thousands of time-slices with each time-slice having a minimum number of 160000 sample points, a more nuanced threshold may be used depending on the expected radar cross section. In the following Table, $\zeta_R$ is computed for a 10 m² target as a function of distance. Thus the threshold value may be set by the expected value of the target at, say 800 km, which in this example would be a threshold value of 2.

TABLE 3

P37 Russian search radar example
10 m² radar cross section

| distance (km) | $\zeta_R$ |
|---|---|
| 200 | 258.4 |
| 220 | 179.56 |
| 300 | 52.77 |
| 400 | 17.47 |
| 500 | 7.80 |
| 600 | 4.32 |
| 700 | 2.82 |
| 800 | 2.11 |
| 900 | 1.683 |
| 1000 | 1.511 |
| 1100 | 1.3465 |
| 1200 | 1.30 |

The invention claimed is:
1. A method for search processing radar data using random matrix theory, comprising:
receiving raw radar data from a single receiving radar antenna;

computing the ratio $\zeta_R$ of the largest to smallest eigenvalue of a constructed sample covariance matrix associated with time-stamped time-slices of the raw radar data;

comparing the ratio $\zeta_R$ of each time-slice to a noise threshold value or a computed nuanced threshold value; and identifying the presence of a signal by having $\zeta_R$ greater than the threshold.

\* \* \* \* \*